United States Patent [19]

Tomczak et al.

[11] Patent Number: 4,683,615
[45] Date of Patent: Aug. 4, 1987

[54] SHIRRING DEVICE

[75] Inventors: Roman M. Tomczak; Alfred J. Evans, both of Raleigh; Grant K. R. Chen, Cary; Edward P. Brinson, Raleigh, all of N.C.

[73] Assignee: Delaware Capital Formation, Inc., Wilmington, Del.

[21] Appl. No.: 911,967

[22] Filed: Sep. 29, 1986

Related U.S. Application Data

[63] Continuation-in-part of Ser. No. 787,506, Oct. 15, 1985, Pat. No. 4,624,029.

[51] Int. Cl.$^4$ .............................................. A22C 13/02
[52] U.S. Cl. ........................................ 17/1 R; 17/42; 17/49
[58] Field of Search ............................ 17/1 R, 42, 49

[56] References Cited

U.S. PATENT DOCUMENTS

| 1,059,411 | 4/1913 | Unversaw et al. | 17/42 |
| 4,359,806 | 12/1982 | Kollruss | 17/1 R |
| 4,373,648 | 2/1983 | Wright et al. | 17/42 X |
| 4,547,932 | 10/1985 | Romeike et al. | 17/1 R X |

*Primary Examiner*—Willie G. Abercrombie
*Attorney, Agent, or Firm*—Allegretti, Newitt, Witcoff & McAndrews, Ltd.

[57] ABSTRACT

An improved shirring device for sausage casing includes a station having opposed shirring wheels for shirring casing onto a mandrel. Opposed jaws positioned for movement transverse to the mandrel operate to engage shirred casing. Both the wheels and jaws are mounted on a slidable platform which is movable axially to transport shirred casing along the mandrel and to compact the shirred casing.

10 Claims, 5 Drawing Figures

SHIRRING DEVICE

CROSS REFERENCE TO RELATED APPLICATION

This is a continuation-in-part application of Ser. No. 787,506, filed Oct. 15, 1985, now U.S. Pat. No. 4,624,029. One of the inventors is common to both applications and the assignee is common to both applications. The text and subject matter of Ser. No. 787,506, filed Oct. 15, 1985 are incorporated herewith by reference.

BACKGROUND OF THE INVENTION

This invention relates to apparatus for forming or folding casings such as sausage casings by shirring the casings on a mandrel or on a tube positioned on a mandrel.

The shirring of casings for meat products such as sausage is an old and well developed technique in the food processing art. Typically a synthetic or natural casing is formed as a long, continuous tube. In order to efficiently and effectively utilize the casing, lengths of it are shirred or folded in pleats transverse to a longitudinal axis of the tube. In this manner, a great deal of casing can be folded and positioned in a sausage or food packing machine, there to be unfolded in a controlled manner according to need as the casing filled with product.

There are numerous prior art patents which disclose equipment for the shirring of casing. Typical among these patents are a series in the name of Kollross including U.S. Pat. No. 4,377,885 entitled "Shaftless Gear Device for Axial Shirring of Synthetic Tubular Material" issued Mar. 29, 1983; U.S. Pat. No. 4,359,806 entitled "Apparatus for Axial Shirring of Plastic Tubular Material Especially Artificial Casing for Sausage Manufacture" issued Nov. 23, 1982; U.S. Pat. No. 4,354,295 entitled "Device for Axial Shirring of Synthetic Tubular Material for Further Processing Especially on Automatic Sausage Stuffers" issued Oct. 19, 1982; U.S. Pat. No. 4,200,960 entitled "Method and Apparatus for Shirring of Synthetic Tubes, Particularly Casings for Sausage Production" issued May 6, 1980; and U.S. Pat. No. 4,370,780 entitled "Process and Device for Axial Shirring of a Tubular Material Using an Air Stream" issued Feb. 21, 1983. The referenced prior art patents disclose rotating wheels positioned to engage against the outside of casing to fold the casing on a mandrel. The particular arrangement of the wheels, the mechanism for driving the wheels and various other supplemental mechanical constructions are disclosed by the prior art patents.

U.S. Pat. No. 4,370,780 discloses an alternative method for shirring casing utilizing an air stream directed obliquely against the casing material in order to effectively pleat or fold the material.

The prior art apparatus for the shirring of casing are useful and effective to provide a high quality shirred casing. However, the apparatus for shirring of casing are extremely expensive and often mechanically complex. Thus, there has remained a need to provide a simple, yet efficient and inexpensive apparatus for the shirring of casing. These are some of the objectives which inspired the development of the present invention.

SUMMARY OF THE INVENTION

In a principal aspect, the present invention comprises a simplified apparatus for shirring of casing material which includes a platform slidably mounted on a frame. A pair of opposed shirring wheels are mounted on the platform pivotal toward and away from each other in order to engage or disengage from casing material. The apparatus further includes a mandrel aligned with respect to the wheels so that as the wheels rotate to engage and shirr casing material, the material is then rucked upon the mandrel or upon a tube supported by the mandrel. The wheels are designed to move generally transverse to the longitudinal axis of the mandrel in order to accommodate various sizes of casing.

Longitudinally spaced from the wheels and positioned on opposite sides of the mandrel are a pair of opposed jaws mounted for movement longitudinally with the platform along the mandrel axis. The jaws are also mounted for movement in the transverse direction with respect to that axis. The jaws thus are situated to engage the shirred casing on the mandrel and translate that casing axially along the mandrel axis to compact the shirred casing.

Thus, it is an object of the invention to provide an improved shirring mechanism for sausage casing and the like.

It is a further object of the invention to provide an improved shirring device of simplified mechanical construction which is economical to manufacture and use.

Yet a further object of the invention is to provide an improved shirring apparatus which includes opposed shirring wheels to engage casing and effect shirring of that casing and a pair of reciprocal jaws arranged to compact shirred material.

These and other objects, advantages and features of the invention will be set forth in the detailed description which follows.

BRIEF DESCRIPTION OF THE DRAWINGS

In the detailed description which follows, reference will be made to the drawing comprised of the following figures.

DESCRIPTION OF THE PREFERRED EMBODIMENT

Referring to the figures, the apparatus of the invention is supported on a mounting frame 10 which is a tubular steel frame in the form of a rectangular parallelepiped having four vertical corner support posts 12, 13, 14, and 15 connected by four longitudinal, horizontal members 16, 17, 18, 19 and four horizontal, transverse members 20, 21, 22, 23. This framework constitutes the mounting frame 10 for the apparatus of the invention.

Figure 1:
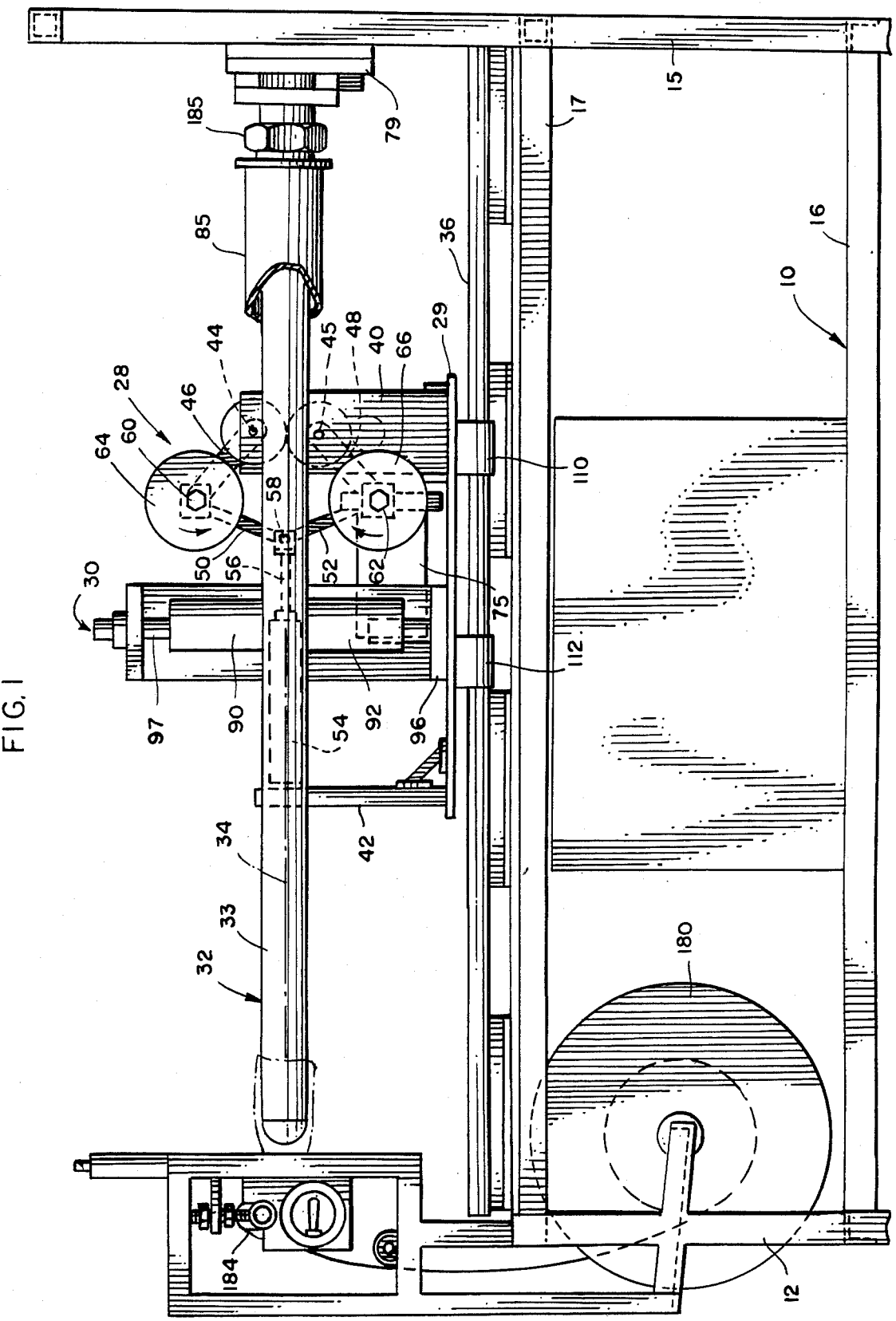
FIG. 1 is a front elevation of the improved embodiment of the invention.

The apparatus includes three interrelated parts or sections; (1) a shirring wheel assembly or station 28, (2) a casing transport assembly station 30 and (3) a mandrel assembly 32. The shirring wheel station 28 is mounted on a platform 29 which is movable relative to the frame 10. The casing transport assembly 30 is also mounted on the platform 29 for movement in a longitudinal, axial direction along an axis 34 with respect to the mounting frame 10. Platform 29 is thus mounted on slide rods 36, 37. The casing transport assembly 30 also includes a jaw mechanism, to be described in greater detail below, with jaws that move transverse to the axis 34. The mandrel assembly 32 includes a mandrel 33 which is pivotally attached to the mounting frame 10 and is pivotal between an axial direction as depicted in FIG. 1 and a pivoted, non-axial position.

For purposes of further description, each separate station or assembly will be described and then the interrelationship and overall operation of the apparatus will be set forth.

Shirring Wheel Station

The shirring wheel station 28 is comprised of a support pedestal 40 attached to and projecting from the platform 29. Platform 29 also supports an air cylinder mounting plate 42 separated from and in opposed relation to pedestal 40. Examining first the function and operation of pedestal 40, pedestal 40 is positioned adjacent one side of the axis 34 defined by mandrel 33. Pivotally mounted on a shaft 44 in pedestal 40 is a first arm 46. Pivotally mounted on a second shaft 45 in pedestal 40 is a second arm 48. The pivot axis of the shaft 44 for arm 46 is above and transverse to the axis 34 of mandrel 33. The pivot axis of shaft 45 for the arm 48 is below and transverse to the axis 34 defined by the mandrel 33. The arms 46 and 48 may pivot toward and away from one another in the manner to be described below.

The arms 46 and 48 are connected together through the first and second connecting links 50 and 52. One end of the connecting links 50 and 52 connects respectively to the free end 47, 49 of the arm 46, 48. Additionally, the links 50 and 52 connect at their other end with each other. Thus, as the links 50 and 52 articulate, they control the spacing and pivoting action of the arms 46 and 48.

An air cylinder 54 having a drive rod 56 is mounted on the mounting plate 42. Rod 56 extends parallel to axis 34 and is connected through an appropriate bushing and pivot connection 58 to the pivot connection of links 50 and 52. Retracting the rod 56 into the cylinder 54 will cause the links 50 and 52 to articulate equally and thereby cause the arms 46 and 48 to uniformly and equally approach one another. Reversing the movement by extending the rod 56 will cause the links 50 and 52 to move toward a straight or unarticulated position thereby spreading the free ends 47, 49 of the arms 46 and 48 equally and oppositely.

Adjacent the free end of each arm 46 and 48 is a journaled shaft 60 and 62 respectively. Positioned in alignment with the axis 34 defined by the mandrel 33 is a shirring wheel 64 on shaft 60. In a similar manner a shirring wheel 66 is positioned on the shaft 62.

Each of the shafts 60 and 62 are driven through a pulley. Thus, shaft 60 includes a pulley 67 having a belt 68 over a drive pulley 70 or shaft 176. An idler wheel 72 is provided on the arm 46 to control the tension in belt 68.

In a similar fashion, a pulley 73 on shaft 62 is driven by a belt 74 which, in turn, is driven by a drive pulley 76 on shaft 174. An idler roller or idler wheel (not shown) controls the tension in the belt 74.

The drive pulleys 70, 76 may be separately driven or simultaneously driven. Importantly, however, they are driven so that the wheels 64 and 66 will counterrotate or be driven in the opposite rotational sense as depicted by the arrows in FIG. 1 so as to shirr casing onto a tube or onto the mandrel 33. Thus, the lower wheel 66 will be driven in the clockwise direction whereas the upper wheel 64 will be driven in the counterclockwise direction.

An electric motor 75 can drive a shaft 170 and an associated gear 171. Shaft 170 is mounted on plate 172 of pedestal 40. Gear 171 cooperates with gear 173 on shaft 174 which in turn drives gear 175 on shaft 176. Shaft 174 and shaft 176 are journaled in plate 172. Importantly, with the described drive train the speed of each wheel 64, 66 will be about equal, though it can be varied.

In operation, unshirred casing 25 (as shown in phantom in FIG. 1) is fed from a reel 180 between drag rollers 182, 184 and onto mandrel 33 and into the region between the wheels 64 and 66. The mandrel 33 is in the axial position aligned with axis 34. To cause the wheels 64, 66 to engage casing 25, cylinder 54 is operated to cause the rod 56 to retract thereby bringing the wheels 64 and 66 into contact with the casing 25. As the wheels 64, 66 counterrotate, they will shirr or ruck the casing onto the mandrel 33. The shirring operation is precisely controlled by control of the air cylinder 54, and the speed of the wheels 64 and 66.

The Mandrel Assembly

Figure 2:
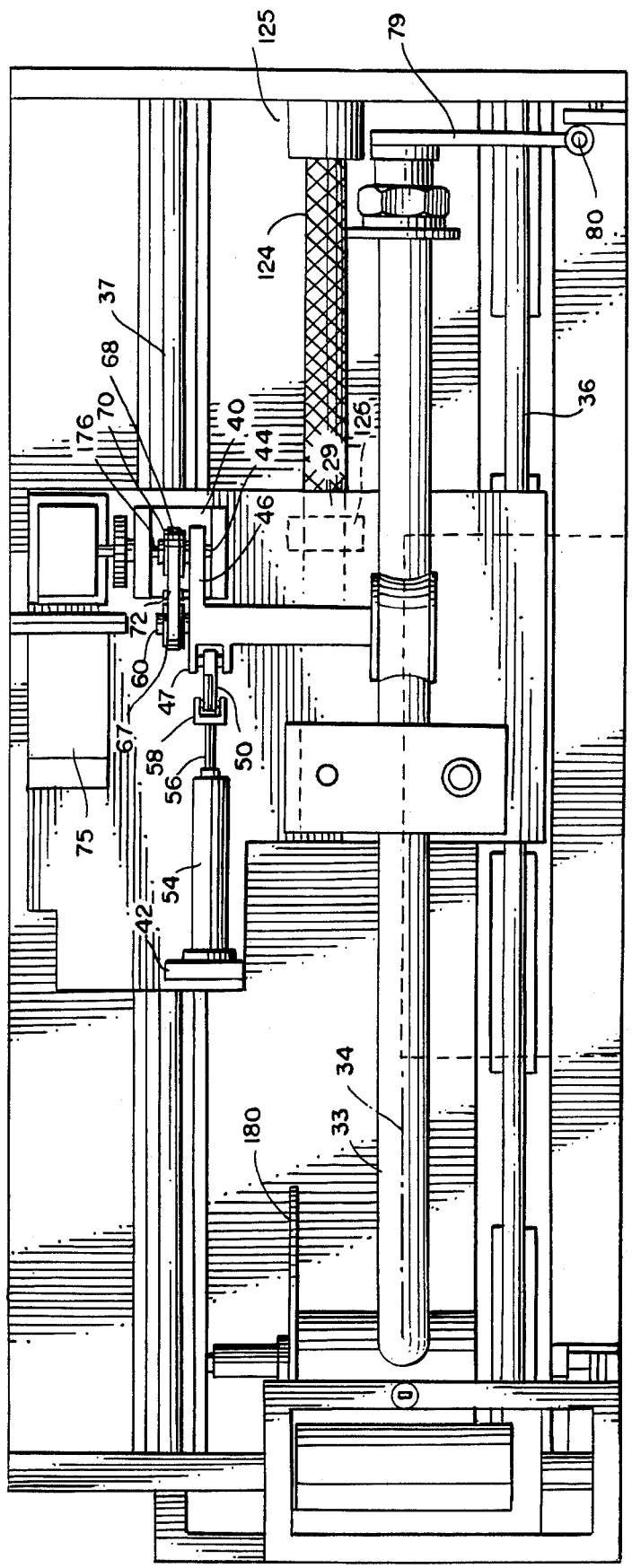
FIG. 2 is a top plan view of the apparatus of FIG. 1.
Figure 3:
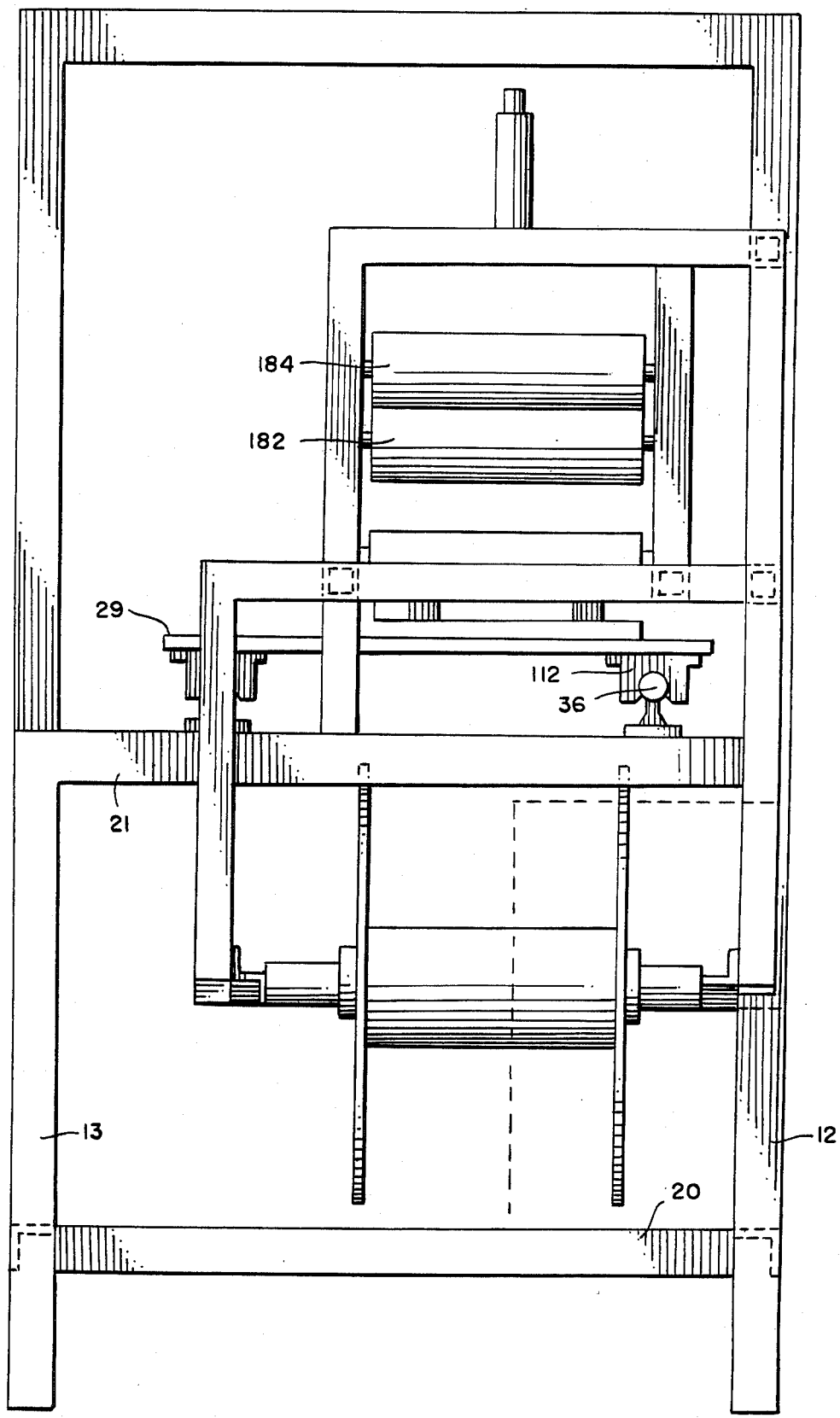
FIG. 3 is a left hand side view of FIG. 1.
Figure 4:
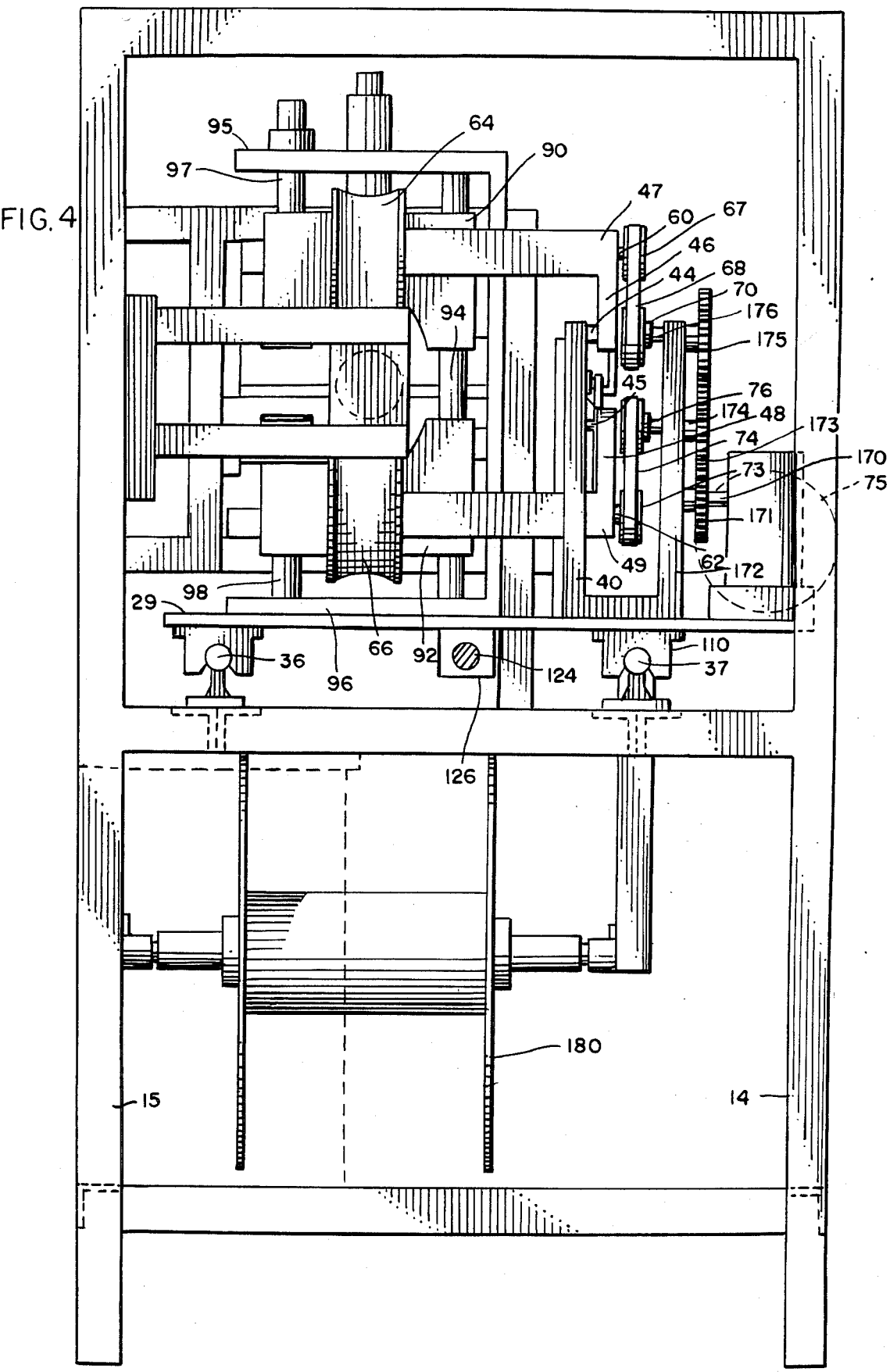
FIG. 4 is a right hand side view of FIG. 1.
Figure 5:
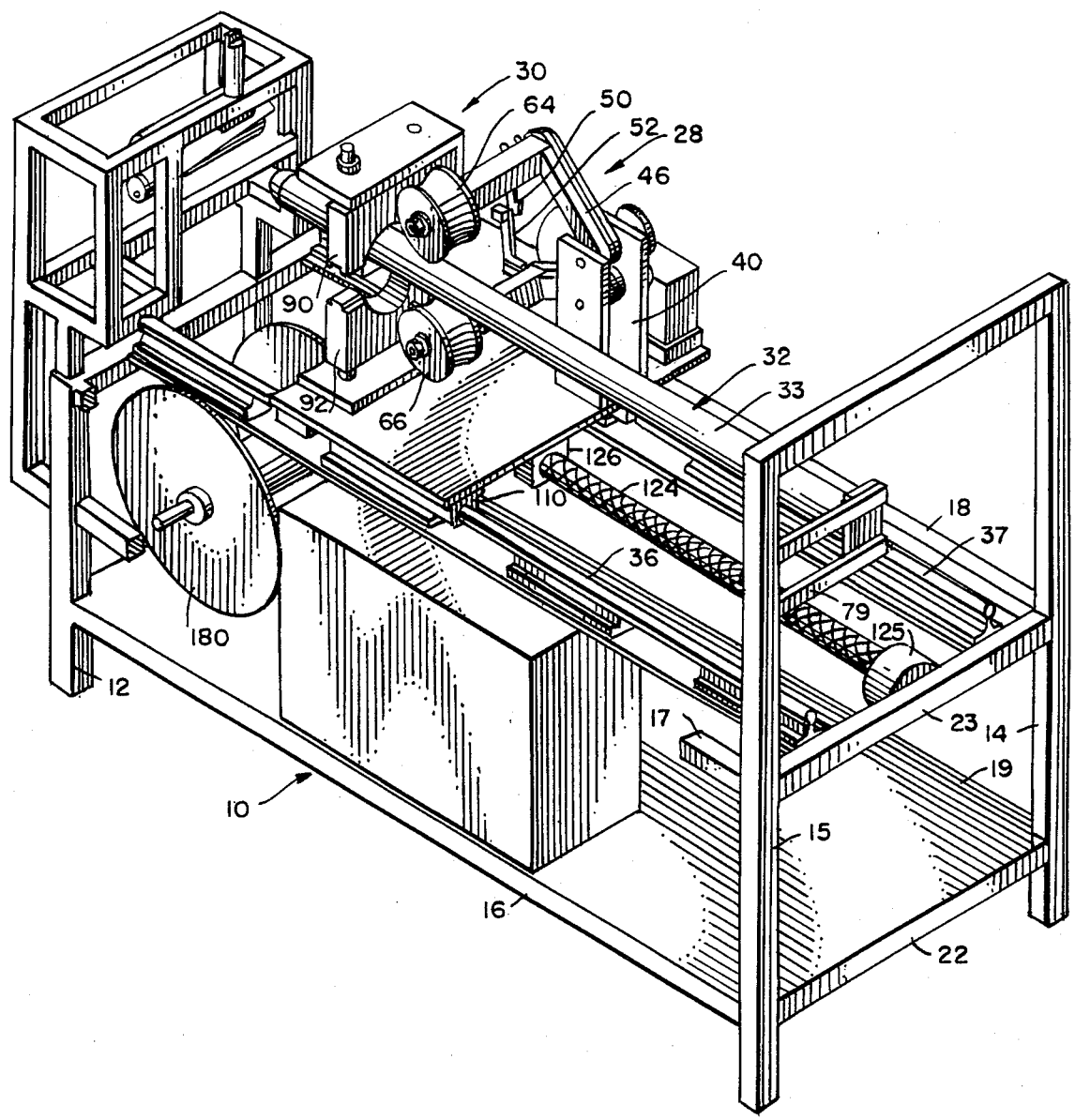
FIG. 5 is a perspective view of the apparatus of FIG. 1.

The mandrel assembly 32 includes the mandrel 33 which is a single extended, straight rod or shaft attached to a mounting plate 79 at one end. Plate 79 is attached by means of a hinge pin 80 to a fixed bracket 84 affixed to the frame 10. The pin 80 permits pivoting of the plate 79 and thus the mandrel 33 about the vertical axis defined by the pin 80. The mandrel 33 may be pivoted to extend along axis 34 as depicted in FIGS. 1 and 2 between the wheels 64 and 66, or it may project at an angle to axis 34.

Mandrel 33 is attached to plate 79 by a threaded collar 185 which connects with a threaded stub welded to plate 79. Thus, the mandrel 33 may be replaced by a mandrel of different diameter, for example.

A tube 85 in FIG. 1 for carrying shirred casing 25 may be positioned on the mandrel 33 or shirred casing 25 may be positioned on the mandrel 33 itself without the benefit of a tube. In any event, during the shirring operation, the mandrel 33 is aligned with axis 34. After shirred casing is placed on the mandrel 33, the mandrel 33 may be pivoted out of the axial position for removal of the shirred casing 25, for example for use with a sausage machine. The mandrel 33 is then pivoted back into position and the additional casing 25 is shirred thereon.

Casing Transport Assembly

A casing transport assembly 30 is mounted on plate 29 which moves axially on rails or rods 36, 37 toward and away from the fixed (i.e. the pivoting) end of mandrel 33. The casing transport assembly 30 includes first and second opposed, spaced jaws 90 and 92 supported by a vertical rod 94 extending between vertically spaced plates 95, 96. Jaws 90, 92 define semicylindrical, opposed openings designed to fit over the mandrel 33 and cooperatively engage against shirred or folded casing 25. The plates 95, 96 each include respectively a rod segment 97, 98 cooperative to position an associated jaw 90, 92 on rod 94. The jaws 90 and 92 are thus fixed with respect to each other a spaced distance sufficient to permit unshirred casing to pass over the mandrel and between the jaws 90, 92. However, the jaws 90, 92 are sufficiently close to the mandrel 33 so that they will engage against shirred casing on the mandrel 33. The spacing of jaws 90, 92 is adjustable on the rods 94, 97, 98.

As shown in FIG. 1, the transport assembly 30 and shirring wheel station 28 are mounted on a platform 29. The platform 29 is slidably mounted on the rods 36 and 37. The plate 29 thus includes first and second slide brackets 110 and 112 attached to the lower surface thereof for cooperation with each rod 36, 37.

Attached to the frame member 23 and cooperating with the platform 29 is a threaded screw 124. The screw 124 is driven by a motor 125 and coacts with a drive nut 126 to thereby extend or retract the platform 29. Thus, as the screw 124 is rotated or driven by the motor 125 in one sense, the platform 29 moves to the left in FIG. 1. Conversely when the screw 124 is driven in the opposite sense, the platform 29 moves to the right. Other mechanisms may be used, however, to effect this axial movement.

Operation of the Assembly

The shirring of casing 25 is effected by operation of the wheels 64 and 66 as previously described. Casing 25 to be shirred is directed onto the mandrel 33 from reel 180. Simultaneous with the initial feed of casing 25 onto the mandrel 33, the platform 29 is positioned at the right side of frame 10 in FIG. 1 adjacent the fixed end of mandrel 33. As casing 25 is continuously shirred, the platform 29 moves to the left in FIG. 1 causing shirred casing 25 to accumulate on the mandrel 33 (or a tube on the mandrel 33) to the right of the counterrotating wheels 64, 65.

Periodically, when the platform 29 has traversed fully to the left end of rails 36, 37 in FIG. 1, the free end of the casing 25 is cut. The jaws 90 and 92 will then engage the shirred casing 25 on the mandrel 33 due to movement of platform 29 to the right in FIG. 1. Before the jaws 90, 92 move to engage the casing 25, the counterrotating wheels 64, 65 stop rotating and are separated slightly. The screw 124 is then operated in order to transport the entire platform 29 to the right as shown in FIG. 1; namely, toward the fixed or pivoted end of the mandrel 33. This will cause the jaws 90, 92 to engage and compact the shirred casing at that end of the mandrel 33. The platform 29 is then reciprocated to the extreme left in FIG. 1 so that the jaws 90, 92 are separated from the mandrel 33. Mandrel 33 may then be pivoted so that the shirred casing 25 can be removed therefrom. The operation is then repeated by positioning the mandrel 33 in its axial alignment position and by again operating platform 29, the wheels 64 and 66 as well as the jaws 90 and 92 in the manner described.

In the preferred embodiment, a single composition operation of shirred casing is required. However, additional compaction steps may be effected to compact the casing on the mandrel or tube 33. That is, the jaws 90, 92 can act to compact casing 25 by reciprocation a number of times.

The controls for the various air cylinders and the motor 172 which drives the shirring wheels 64, 66 are not shown. Such controls are considered to be within the skill of the art and may take various forms. The timing, and speed of operation of the various component parts is somewhat empirical depending, inter alia, upon the casing being shirred.

It is possible to vary the construction of the jaws 90, 92. It is also possible to provide another mechanism for spreading the jaws 90, 92, and an assembly for otherwise transporting the jaws 90, 92 and wheels 64, 65 axially. Further, it is possible to vary the construction of the shirring wheel support station 28. For example, it is possible to vary the mechanism by which the shirring wheels 64, 66 are moved relative to each other. Thus, while there has been set forth a preferred embodiment of the invention, it is to be understood that the invention is to be limited only by the following claims and their equivalents.

What is claimed is:

1. Apparatus for shirring of casing comprising, in combination:
   a mounting frame;
   a shirring wheel, support station slidably mounted on the frame, said station including:
      a support platform,
      first and second generally parallel, spaced, opposed, support arms, each arm pivotally supported at one end on the platform, the opposite end of one arm pivotal toward and away from the opposite end of the other arm,
      means for pivoting at least one of the arms toward and away from the other arm,
      each of said arms including a shirring wheel rotatably mounted thereon, said wheels being opposed to one another and rotatable about axes generally transverse to the direction of movement of casing to be shirred,
      drive means for driving said wheels to shirr casing fed between said wheels as said means for pivoting maintains the wheels in physical contact with casing material fed therebetween;
   a mandrel supported on the frame along an axis generally tangent to the wheels and aligned for receipt of shirred casing from the wheels, said mandrel including a free end and a fixed end, said free end extending between the opposed wheels, said fixed end supported by the frame; and
   a casing transport assembly mounted on the support platform for movement with the platform and wheels axially toward and away from the fixed end of the mandrel, said transport assembly including:
      at least one casing jaw member laterally adjacent the axis,
      means for moving the jaw member axially to engage shirred casing, and
      means for releasing the jaw member from engagement with shirred casing by movement in a reverse axial direction.

2. The apparatus of claim 1 including linking means for linking the arms together, and further including means for articulating the linking means to control the spacing of the wheels and contact of the wheels with casing that is being shirred.

3. The apparatus of claim 2 wherein the arms extend generally along the axis and the linking means include at least two connected links connecting the first and second arms and said means for articulating comprises means for varying the angular relationship of the links.

4. The apparatus of claim 1 including first and second opposed jaw members on the casing transport assembly.

5. The apparatus of claim 4 including means for controlling the spacing of the jaw members.

6. The apparatus of claim 1 including means for pivotally mounting the mandrel for movement between axial alignment and non-axial alignment.

7. The apparatus of claim 5 including means to move both jaws transversely to the axis.

8. The apparatus of claim 1 including means for reciprocating the platform toward and away from the fixed end of the mandrel.

9. The apparatus of claim 1 including rail means mounted on the frame parallel to the axis, said support platform mounted on the rail means.

10. The apparatus of claim 1 including control means for sequentially controlling operation of the shirring wheels and jaw members.

* * * * *